July 15, 1930.　　　　W. L. PADEN　　　　1,770,708
INDICATOR CONTROL DEVICE FOR CASH REGISTERS
Filed April 27, 1925　　　6 Sheets-Sheet 1
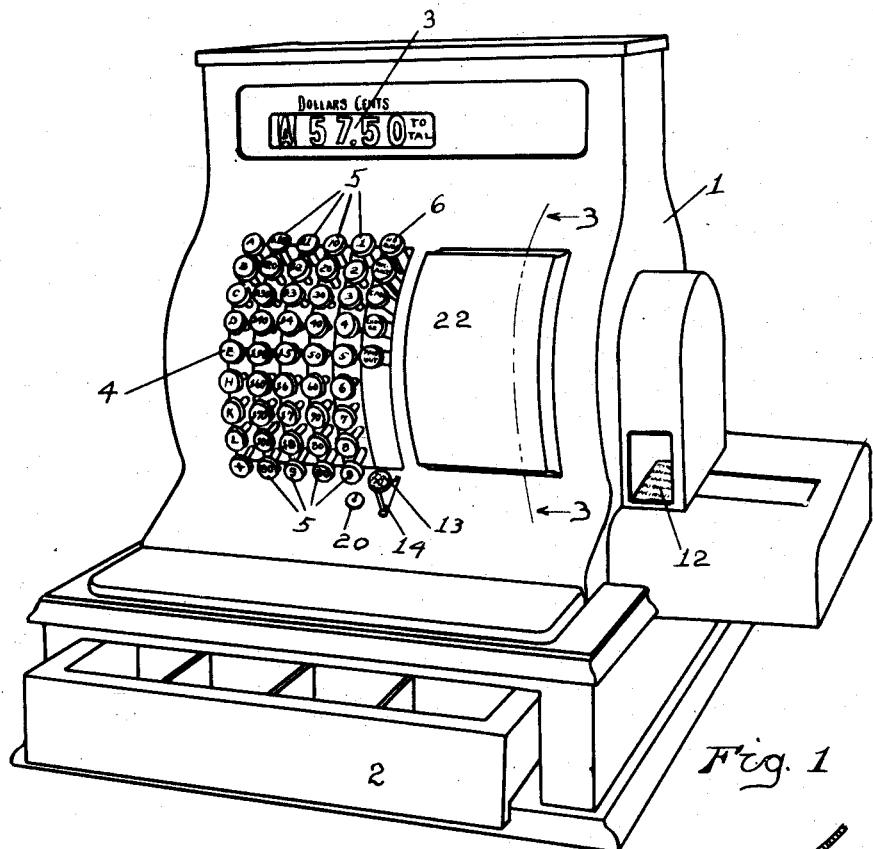
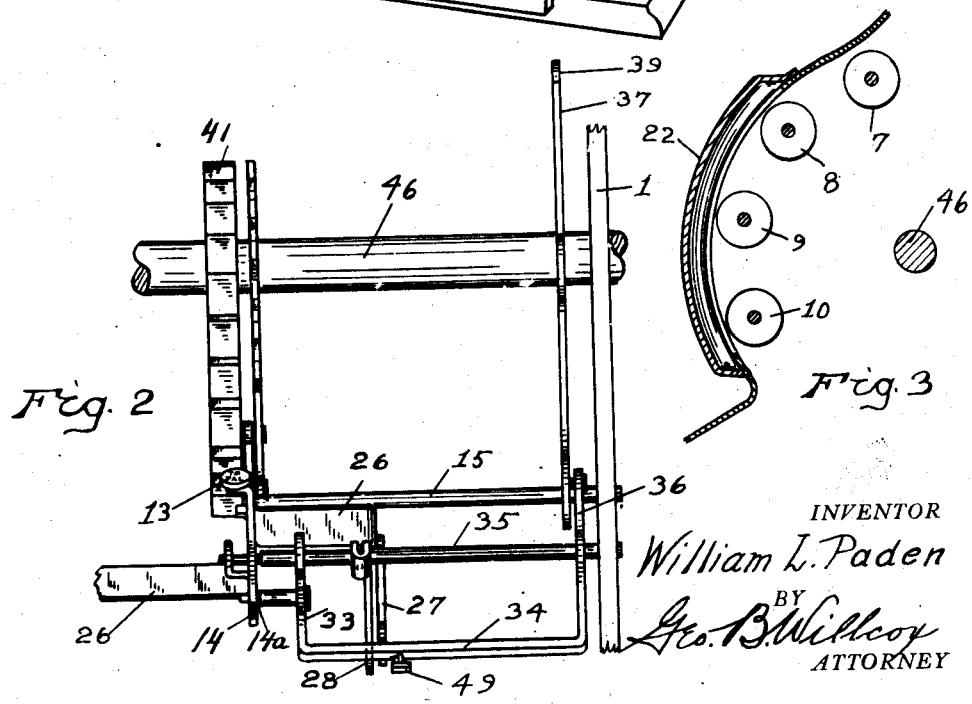
INVENTOR
William L. Paden
BY Geo. B. Willcox
ATTORNEY July 15, 1930.  W. L. PADEN  1,770,708
INDICATOR CONTROL DEVICE FOR CASH REGISTERS
Filed April 27, 1925  6 Sheets-Sheet 2

INVENTOR
William L. Paden
BY
Geo. B. Willcox
ATTORNEY

Inventor
William L. Paden
By Geo. B. Willcox
Attorney

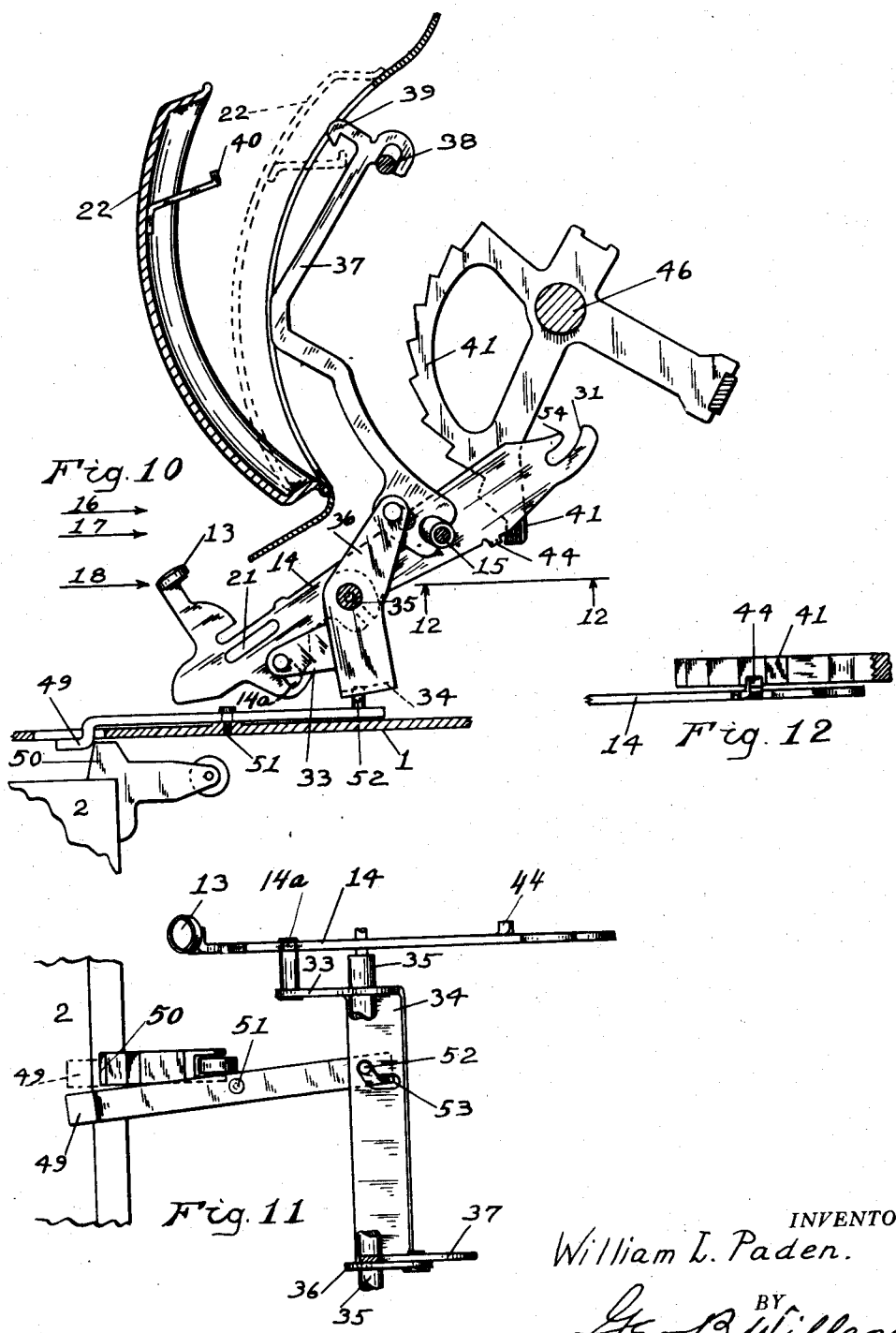

July 15, 1930.  W. L. PADEN  1,770,708
INDICATOR CONTROL DEVICE FOR CASH REGISTERS
Filed April 27, 1925   6 Sheets-Sheet 5
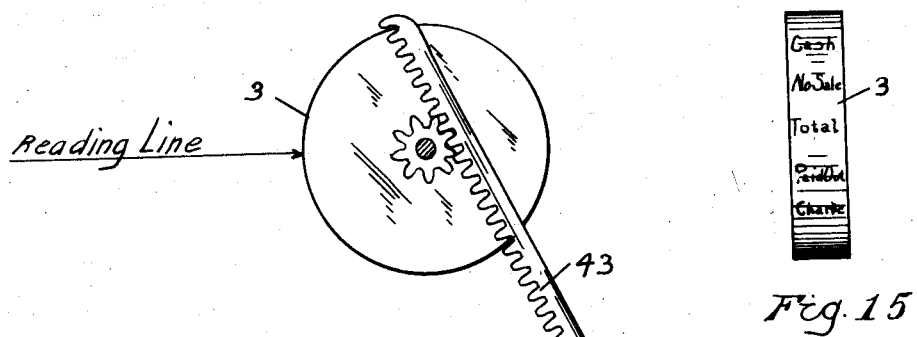
Fig. 15
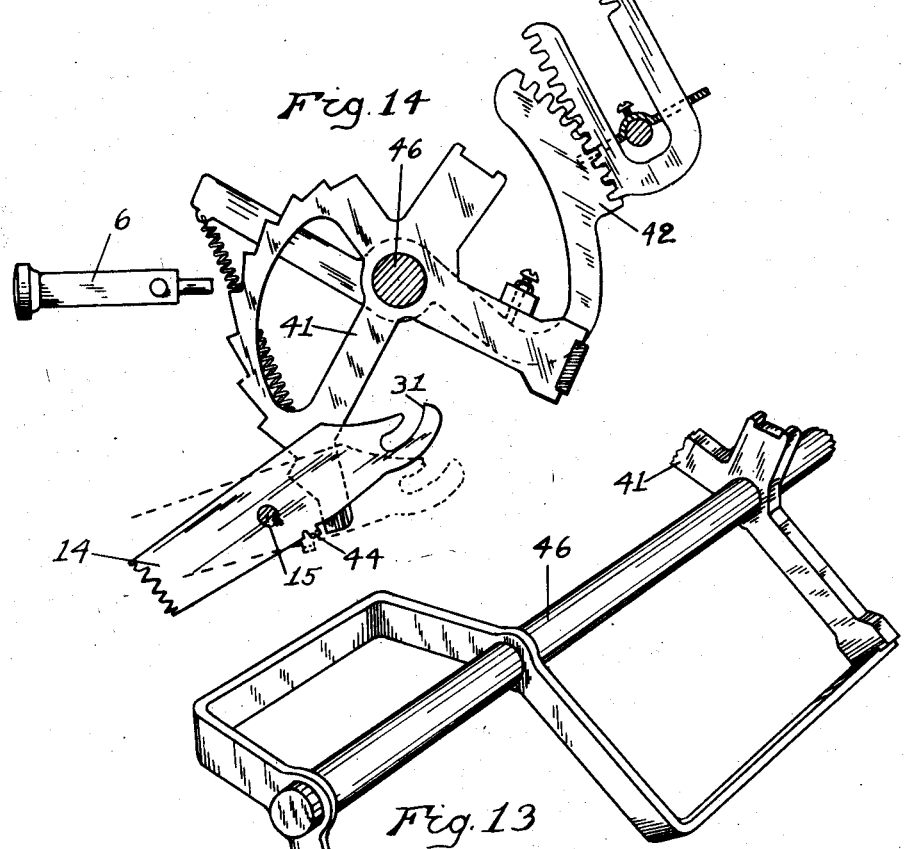
Fig. 14
Fig. 13
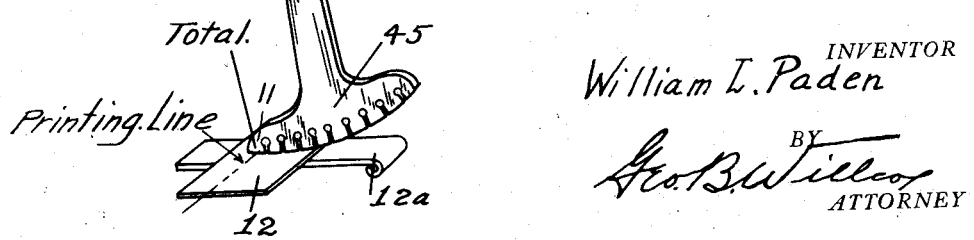
INVENTOR
William L. Paden
BY
Geo. B. Willcox
ATTORNEY

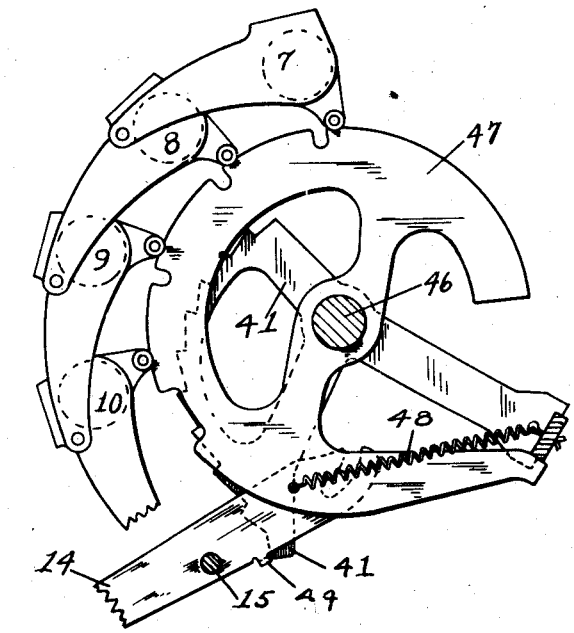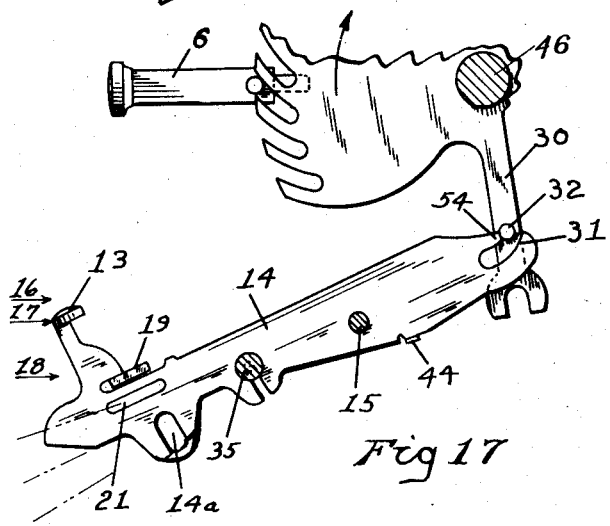

Patented July 15, 1930

1,770,708

UNITED STATES PATENT OFFICE

WILLIAM L. PADEN, OF SAGINAW, MICHIGAN, ASSIGNOR, BY MESNE ASSIGNMENTS, TO OHMER FARE REGISTER COMPANY, OF DAYTON, OHIO, A CORPORATION OF NEW YORK

INDICATOR-CONTROL DEVICE FOR CASH REGISTERS

Application filed April 27, 1925. Serial No. 26,107.

This invention is a total-indicator control device that may be adapted to any cash register of the upright key board type.

In the operation of the ordinary cash register of small capacity, not equipped with initial key, departmental key or printer, but having an "operating" key, it has been customary for the owner at the close of the day's business to read the counter and balance the cash. This is done by depressing the operating key, and results in showing on the customer's indicator wheels, 00.00, and in opening the drawer. The operator then takes a separate key and unlocks the lid over the counter. He reads the counter to get the total of the day's transactions. He then balances the cash. In order to take the cash drawer out of the machine for safe storage he has to manipulate by hand a separate latch.

With my improved control or total key applied to such a small capacity machine, all of these operations are much simplified, that is, at the end of the day's business the owner merely depresses this total key, whereupon the customer's wheels indicate zero as before, but the cover over the counter automatically opens, and the cash drawer opens. By holding the total key down the drawer further more is automatically released from the machine so it can be taken out for storage.

A further advantage of my total key construction as applied to machines formerly used, has to do with the locking of the machine. In the older type the operator was obliged to lock both the counter cover and the cash drawer by separate key-operated locks. In my improved device he merely locks the total key and this key in turn locks both the counter cover and the drawer.

Formerly, as above stated, the cash drawer of a register could be locked, by a lock and key, but the rest of the mechanism could not be locked by the same means. Consequently it has heretofore been possible to impress entries on the key board while the drawer was locked, and since such entries became permanent records when the drawer was next opened, the record was confused.

In my improved device, the control, or total key itself may be locked, either in its raised position or in its partly depressed position. Locked in its raised position it permits the register mechanisms to function, but prevents any person without a key from reading the counters, and it prevents the cash drawer being removed from the machine. Locked in its partly depressed position it blocks all operations of the register.

My improved total key has still further advantages when applied to a register of more complete type, that is, having a bank of initial keys, a bank of departmental keys and a printer.

When applied to such a complete machine my total key imparts to the cash register the capacity of acting as a "telltale" to show on the customer's wheels, and furthermore to show by a permanent printed record, that someone has operated the register to take a reading of the day's business. It shows also between what two of the day's transactions this reading occurred, and it shows what clerk's initial key was depressed when the reading was taken.

For example, in a machine not equipped with this total key, it is possible for a clerk having possession of the separate keys to the counter cover and cash drawer, to take from the machine a record of the day's sales, leaving on the printed detail-strip merely—"no sale" entry. With my total key, however, the printed strip shows, by a characteristic printed record, such as the word "Total", that a reading of the counters has been taken, and if such reading has occurred during the progress of the day's business the significant word "Total" will appear between two of the regular day's unrecorded transactions. Consequently the time of day when the reading was taken can be quite accurately determined. In my machine it is impossible to take a "total" reading without making a permanent entry of the fact on the printer. In that function lies one of the important advantages of my improvement.

Another important advantage is, when desired an amount entry can be printed on the detail strip without adding it into the counters. In the former types of machines without my improvement, any amount that is impressed in the key board must also appear on the counters in order to appear on the printed detail strip, provided there is a counter for each key; but with my improvement the "Total" key when desired automatically holds the counters out of operation while the desired entry is being impressed on the key board and printed on the detail strip.

In the drawings, Fig. 1 is a front view of a cash register embodying my improvements.

Fig. 2 is a front view of the total indicator control key and its connected parts.

Fig. 3 is a diagrammatic part sectional view of the counter cover, taken on line 3—3 of Fig. 1.

Fig. 10 is a part sectional side view of the total key completely depressed, and its associated parts.

Fig. 11 is a plan view of the releasing device for the counter cover.

Fig. 12 is a bottom view of the stop for a graduated segment.

Fig. 13 is a perspective view of the main journal and a type segment thereon.

Fig. 14 is a fragmentary part diagrammatic side view of the "Total" key bar fully depressed, and its associated segment, performing the "telltale" function.

Fig. 15 is a face view of a customer's indicating wheel.

Fig. 16 is a fragmentary side view of the devices by which the "Total" key functions to hold all counters inoperative.

Fig. 17 is a side view of the "Total" indicator control key and its bar for controlling the operativeness of the departmental key.

Fig. 18 is a view of part of a printed detail strip.

Figure 4:
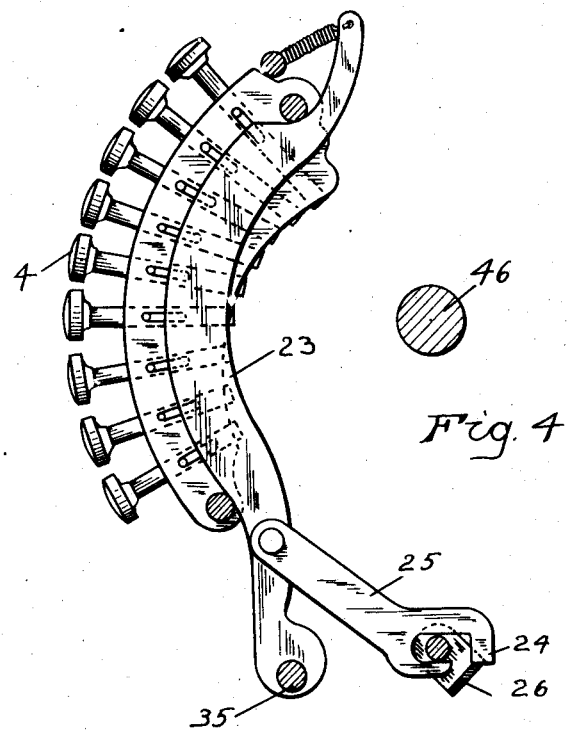
Fig. 4 is a side view of a bank of initial keys and their latch plate in its outward position.

As is clearly shown in the drawings, a cash register to which my improvement is adapted to be applied consists in a frame 1 having a cash drawer 2, customer's indicating wheels 3 and a key board, including an initial key bank 4, a numeral or amount key bank 5 and a departmental key bank 6.

7, 8, 9, 10,—Fig. 3—indicate counters. These counters may be arranged in any usual or convenient grouping, but for purpose of illustration I will show them arranged as they are in the machine described in my co-pending application, Serial No. 736,281, to which reference may be had for descriptions in detail of the operating parts of a preferred type of register to which my present improvement may be applied.

Numeral 11—Fig. 13—indicates a printer of any suitable or usual kind. 12 is the detail-strip adapted to be printed by being struck up against the type of the printer 11, by a suitably actuated member 12ª, shown diagrammatically. The details of the mechanism by which member 12ª is actuated are not illustrated, since they form no part of my present invention, and are well known in the cash register art.

Numeral 13—Fig. 17—designates my improved "Total" indicator control key, preferably carried by a bar 14 and comprising a means for properly positioning the strip printer, as will be described later.

The novel functions and mode of operation of my present invention depend largely upon bar 14 or its equivalent, because 14 is the movable member, adjustable to various positions, that actuates and controls certain parts of the register whereby the new results above set forth are attained.

Member 14 is preferably a flat bar pivotally mounted on a fixed journal 15 carried by frame 1. Bar 14 and its key 13 can be set in any one of three positions as follows: The raised position 16, the partly depressed position 17, or the fully depressed position 18, and can be locked or fastened, either in its raised position or its partly depressed position, by the latch 19 of an independent key-operated tumbler lock 20 on the frame 1. See Figs. 1 and 17.

There are a number of devices, such as notches, cam surfaces and projections provided at suitable places on bar 14. Each is arranged to perform its own peculiar function, either to move certain of the operating parts of the register when key 13 is depressed, or to stop their movement when key 13 is in one of its various set positions. Each such set position, and the corresponding functioning of members on bar 14, has to do with accomplishing some one of the desired results mentioned above.

One of its functions, as when fully depressed, see Fig. 14, is what I term the "telltale" function of the machine. If any person exposes the counters to read them the machine prints a characteristic record, showing what clerk's initial key was depressed to do it, and also between which two transactions in the day's business it occurred.

Figure 5:
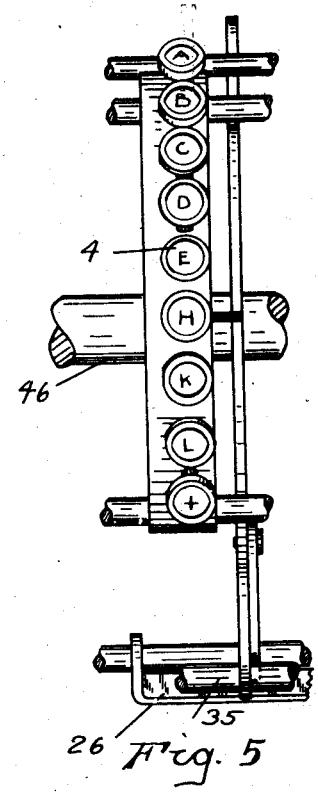
Fig. 5 is a front view of the parts shown in Fig. 4.
Figure 6:
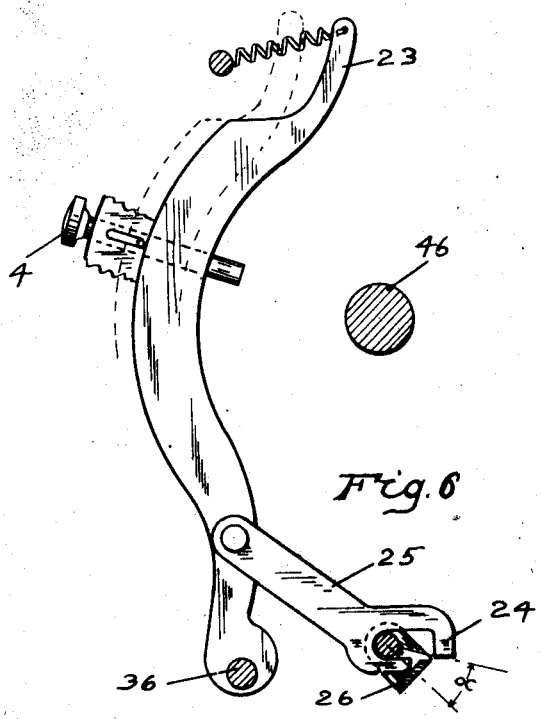
Fig. 6 is a side view of the latch plate in its inward or depressed position.

The "telltale" operation is as follows: First, the initial key 4, shown in Figs. 4, 5, 6, is depressed; then the total key 13 is completely depressed, as in Fig. 10. The operator, as will now be explained, is enabled by these two operations to read the individual counters and thereby ascertain the total of all previous transactions on each departmental counter. The totals are not printed thereby, but if desired they may be individually printed by subsequent operations of the control key 13, as will be later described.

Figure 7:
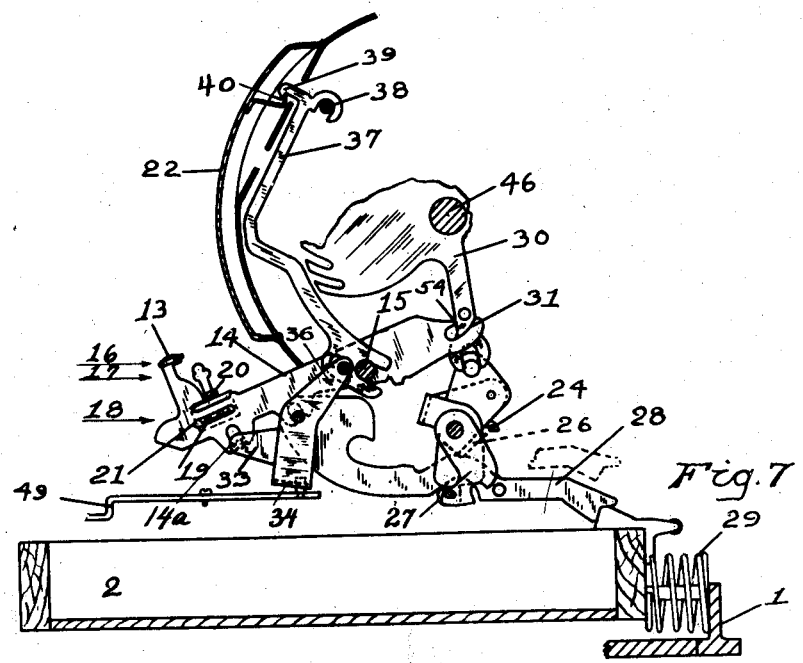
Fig. 7 is a part sectional side view showing the drawer-release mechanism connected to the control key.

It may be stated in general that the initial key 4, Figs. 1, 4, 5, 6, sets the mechanism so that the drawer can be unlatched; second, the total indicator key 13, Figs. 1 and 7, thereafter depressed, unlatches the cash drawer and permits it to spring open; third, the same indicator key, as in Fig. 10, releases the counter cover, which opens and exposes the counters to be read.

The drawer 2, by springing open, brings about transfer among the number wheels of all the counters in the usual way. It also holds the customer's indicating wheels 3 in position to show the telltale word "Total" thereon, and displays the numerals 00.00.

Before my invention of key 13 and its associated parts it was customary to lock the counter cover by a separate key-actuated tumbler lock, requiring the operator to find the key and unlock the cover before he could read the counters.

More in detail, the operations with my improved key 13 are as follows:

Referring to Figs. 1, 4, 5 and 6, depressing initial key 4, as is common in the working of a cash register, moves the usual latch plate 23 from its dotted position—Fig 6—to the full line position. The extremity 24 of latch 25 moves away from the path of a pivotally mounted yoke 26, Figs. 6, 7, 9, and thereby makes it possible to depress one of the departmental keys 6 or the control key 13, either of which will release the drawer.

Figures 8, 9:
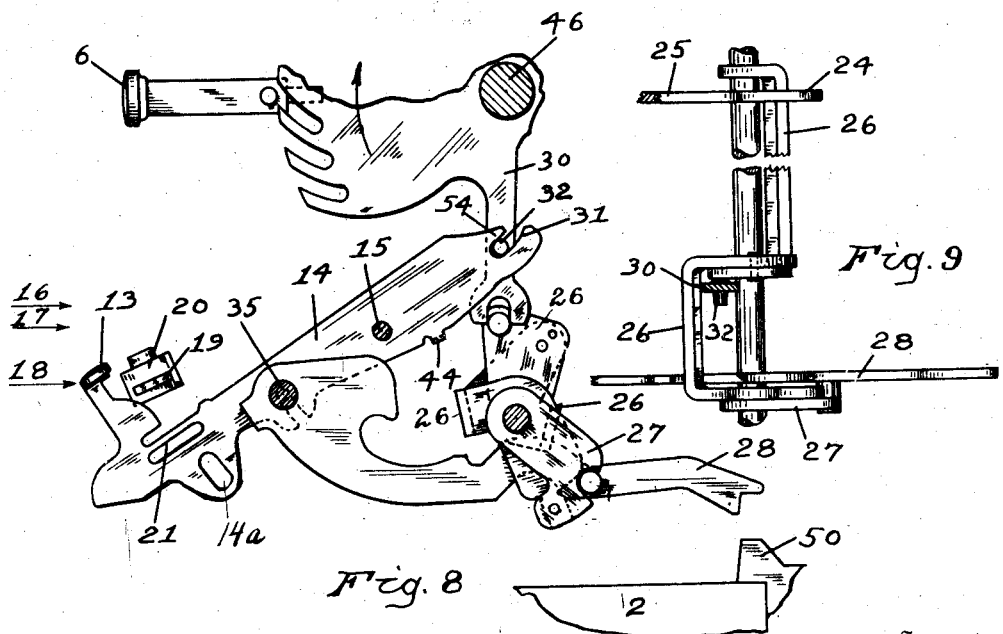
Fig. 8 is a fragmentary side view, to a somewhat larger scale, showing the positions of the parts when the total indicator control key is completely depressed, to expose the counters.
Fig. 9 is a part sectional plan view of the yoke member of Fig. 8.

Referring to Figs. 7 and 9, yoke 26 is seen to be integral with latch-lifting plate 27. Therefore, when the yoke is permitted, by 24, to swing upward, through an angle as indicated in Fig. 6, the latch plate 27 lifts the drawer latch 28 into the position indicated by dotted lines in Fig. 7, thereby releasing the drawer and allowing it to be thrown open by spring 29.

Total key 13 is depressed, as shown in Fig. 8, instead of departmental key 6, to permit reading the counters. When key 13 is depressed the other end of bar 14 rises and a cam slot 31 in the end thereof engages a pin or stud 32 on release plate 30 and moves the release plate 30 clockwise, as shown by the arrow. This lifts the drawer latch 28 as it would have been lifted by departmental key 6. The cam slot 31 or its equivalent, therefore, constitutes a means for actuating the drawer-releasing devices 32, 30, 26, 27 and 28, usually actuated by departmental key 6.

A novel feature of the operation of key 13 is that it automatically unlocks the counter cover 22—Fig. 10. This cover-release mechanism is shown in detail in Figs. 2, 7, 10 and 11. An arm 33 of a swinging yoke 34 is operatively connected by pin-and-slot connection 14$^a$, to the lower edge of bar 14. Yoke 34 is loosely journaled on a rod 35 carried by the frame 1. See Figs. 10 and 11. Yoke 34 extends across the machine and has at its other end an arm 36, the upper end of which is pivoted to the lower end of a link 37, see Fig. 10. The upper end of this link is guided by a stationary bar 38. Similarly, the lower end of link 37 is guided by the fixed journal or bar 15 and is capable of a limited up-and-down movement with respect to the two fixed bars 15 and 38. The upper end of the link 37 is formed with a hook 39 adapted to releasably engage a latch plate 40 carried by the cover 22, which, when released, falls backward as shown in Fig. 10, by gravity or otherwise.

Thus key 13 and its associated parts constitutes a means for automatically releasing the cover 22 and for exposing the counters, as well as for releasing the cash drawer so it can be removed from the machine. Furthermore, key 13, by bar 14 and its cam slot 31, performs all the ordinary functions of a departmental key 6.

Key 13 also operates as a telltale to indicate, on the customer's indicating wheels 3, that some person has taken a reading of the total day's business.

The mechanism ordinarily used for operating the customer's indicating wheels is shown in Figs. 14 and 15 When bar 14 is associated therewith as shown, it becomes a means for bringing about the desired "telltale" indication, which consists in a word such as "Total" when shown on the reading line of the departmental indicating wheel.

Now, referring to Fig. 14, 6 is the usual departmental key, the end of which, when pushed in, engages the proper notch of the usual departmental graduated segment 41. This segment is a well-known means for moving and positioning the customer's indicating wheels 3, to read "Total" and also for positioning the printing segment 45 to print "Total"—Fig. 13. It also positions the counter-selecting mechanism to hold all counters inoperative, as in Fig. 16. The notches in the graduated segment—Figs. 2 and 14—serve as stops which, by engaging the end of key 6, limit the rotating movement of the segment, thereby limiting the downward travel of the segmental gear 42, which is actuated by segment 41, and limiting the movement of the rack 43, by which the customer's departmental indicating wheel 3 is rotated into a position corresponding to the particular departmental key 6, depressed.

Bar 14—Figs. 10, 12, 14—carries a projection or equivalent device 44 adapted, when bar 14 is actuated by the depressing of key 13, to stop the graduated segment 41 in the same manner that any departmental key 6 may act as a stop.

Stop 44 constitutes a means for, firstly, preventing the operation of the counter; secondly, for holding the word "Total" in view on wheel 3 and thirdly, for causing the printer to print "Total".

It has been seen that depressing key 13 and its bar 14 causes the customer's indicator wheel 3 to show "Total", which is the characteristic "telltale" signal that indicates to the user and to the customer that the counter has been read. Now, in connection with this telltale function of bar 14 it has a still further function, namely, to position the printer, Fig. 13, with respect to the printing line so that the detail-strip 12 will receive the printed "telltale" record. This record may, as stated, consist of the word "Total" or other characteristic symbol. Bar 14 when depressed by key 13 positions the printer by setting the type segment yoke 45 in place, employing the following means:

Segment yoke 45 turns loosely on the main journal 46 and at its far end, Fig. 13, is fixed to graduated segment 41. When stop 44—Fig. 14, limits the customer's indicator wheel to show "Total", it also limits the movement of the type segment or strip printer 11, thereby holding the word "Total" in printing position. Thus does bar 14 with its stop 44 constitute means for causing both the customer's indicating wheel and the printer to read "Total" when key 13 is depressed.

From the foregoing it has been seen that depressing bar 14 by means of key 13 delivers on the detail strip 12, Fig. 8, a record "A 00.00 total" showing that some person exposed the counters, and that initial key —A— was depressed to do it. The location of this printed record after any transaction, as "A 3.00", indicates at what stage of the day's business the control key was depressed and the counters read.

Since suitable printing mechanisms are applied to many cash registers, and since such mechanism does not form a part of my present invention, the details of the printing mechanism will be omitted from the drawings and it is represented symbolically by the numeral 12ª, Fig. 13.

Another function of the machine is found useful in certain circumstances, as for example, the proprietor, leaving for a while, may instruct his clerk to print the separate counter readings on the detail strip at the end of each day's business, yet not to disturb the counters in their record of the complete week's business.

By my improved arrangement the clerk at the end of each day can open the machine by means of the total key, read the counter, set up the counter reading on the key board, as "A 57.50", and while the counters are out of action he can print the amount, "A 57.50", together with the telltale word "Total" on the detail strip. The operations are as follows:

In a machine having several counters, after the operation at which the record "A 00.00 total" was printed, the clerk's initial key is again depressed. The first counter reading desired to be printed is set up on the amount key bank and the total indicator control key is again depressed, thereby opening the drawer and positioning the printing mechanism, ready to print the first counter reading.

Simultaneously the amount is displayed on the customer's indicator wheel, along with the clerk's initial and the word "Total". The drawer is then closed by the operator, printing the amount, together with the word "Total" or other suitable symbol and the clerk's initial. The remaining counter readings are printed in like manner by separate operations of the total key.

Whenever the drawer is opened by my control key all the counters are rendered inoperative, as to adding, and when the drawer is thereafter closed the counters are held in their inoperative positions. Consequently the total reading of any counter can be set up on the key board and printed, without going through the counters, and it does not in any way affect the previous readings of the counters.

This is accomplished by the means shown in Figs. 16 and 12.

Referring to Fig. 16, the counters 7, 8, 9, 10 are shown in their inoperative positions, being held outward by the rim of the counter cut-out and selecting plate 47. To become operative the counters must drop into the notches in the rim of that plate, but they can not do so until the plate has been rotated on journal 46. This plate is tied to graduated segment 41 by the spring 48, and the segment and plate 47 move together. When the segment is stopped by projection 44 on bar 14, as previously described, plate 47 holds the counters in their outward or inoperative position. Hence the total reading of any counter when impressed manually on the numeral banks of the key board will be set up in the numerals of the printer 11, but will not affect the readings of the counters 7, 8, 9, 10.

As a result of the foregoing operations, the machine delivers a printed strip showing, first, the initial of the clerk who opened the machine; second, the total or sum of the day's transactions in each counter or department up to the time the machine was opened; third, the word "Total" or other symbol indicating that some one has opened the machine and taken the total readings.

After the clerk has computed and entered the counter totals as above described, and has made the printed record, he can reset the counters to zero for a new day's business by operating the usual resetting mechanism of the register. Such resetting mechanism is not illustrated herein, as it does not form part of my present invention, and is common in machines of this kind.

To the proprietor, the word "Total" or other symbol on the detail strip becomes of further practical service in the event that some unauthorized person has opened the register, taken the total readings of the counters and then reset the counters to zero for the purpose of confusing the record and preventing the proprietor from ascertaining the correct total of his day's business.

The word "Total" always indicates to the owner that someone has read the counters, even though they may have been reset to zero. The clerk's initial is of assistance in placing the responsibility.

The indicator control key 13 enables the drawer to be taken away from the machine for safe keeping, without the necessity of manipulating any special locks or latches as heretofore. When the initial key is depressed, and the total indicator control key is pushed down and held down by the operator, the drawer can be pulled clear out and removed to a safe place for storage.

When the initial key 4 is depressed, it releases the drawer-retaining mechanism, as previously described, so that, later upon operating the control key 13, the drawer 2 will be released and will automatically open. But the drawer can not then be taken out of the machine, because it is held, as shown in Fig. 10, and at the dotted lines in Fig. 11, by a swiveled stop-bar 49, engaging a projection 50 on drawer 2. Bar 49 is swiveled by a pivot pin 51 on frame 1 and may be disengaged from projection 50 by being moved sidewise, as shown in Fig. 11. A projecting pin 52 on bar 49 travels in a bayonet slot 53 in the yoke 34. When the yoke is swung by arm 33, bar 14 and key 13, as previously described, the latch bar 49 will disengage projection 50 and release drawer 2, so it can be removed.

As shown in Fig. 17, the total indicator control key 13 may also be used to lock the entire mechanism of the register against operation, thereby preventing unauthorized access to the cash drawer. To serve this function the control key 13 is only partly depressed and is there locked by the latch 19 of any suitable tumbler or other lock 20. This latch constitutes a preferred means for fastening member 14 in variously adjusted positions. While the control key is in this partly depressed position the drawer can not be opened, nor can any transaction be recorded, for reasons that will now be explained.

Referring to Figs. 7, 8 and 9, it will be remembered that drawer latch 28 can not be lifted to permit the drawer to open unless latch-lifting plate 27 turns from its position in Fig. 7 to the position shown in Fig. 8, and this plate can not turn unless release plate 30 moves clockwise in the direction of the arrow, as shown in Fig. 8. If key 13 is only partly depressed, as at 17, Fig. 17, and is there locked by the latch 19 of tumbler lock 20 as above described, a finger projection 54 on bar 14 then lies in front of and prevents movement of release plate 30 in the direction of the arrow. Hence, when key 13 is locked in its partly-depressed position, the drawer 2 can not be opened. Thus, projection 54, or its equivalent, comprises a means for engaging the drawer-releasing device and for holding it inoperative.

Without opening and closing the drawer, no transaction can be recorded.

My improvement also provides for the employment of this same separate and independent tumbler lock 20 to lock the total key 13 against operation, leaving the usual functions of the cash register unaffected. It also prevents unauthorized reading of the counter totals.

To this end I arrange the total key so it can be locked in its normal or raised position 16—see Fig. 7. It can not then be depressed until lock 20 is unfastened. The various counters can not be exposed to view, nor can the word "Total" be printed on the amount strip until key 13 is unlocked and then depressed, although the machine is free to perform all of its otherwise normal and usual functions just as if the total key and its associated parts were not in the machine.

Referring now to the detail-strip shown in Fig. 18, it is seen that at the beginning of the day's business as printed thereon, clerk A depressed the "No sale" key and opened the drawer and then closed the drawer; two cash transactions by clerks B and C were followed by a "received on account" transaction by clerk B; then follows a record of typical cash register transactions until at the end of the day's business clerk A opened the cash register and exposed the counters by using the total indicator control key 13. Upon closing, the drawer made the telltale record "A 00.00 total". He then took the counter reading 57.50 and set it up on the numeral bank. He next depressed the key 13, which opened the drawer and established the amount on the customer's indicator wheels along with his initial and the word "Total". He then closed the drawer, whereupon there was printed on the detail strip the final entry "A 57.50 total", showing that clerk A, at the end of the day's transactions, had manipulated the total-indicator control device, read the counters, and made a record of the total of the day's transactions.

Having thus described my invention, what I claim and desire to secure by Letters Patent is:

1. In a cash register, a frame, a totalizer-cover and means for normally locking said cover, a cash drawer, a latch therefor adapted to normally prevent detaching the drawer from the machine after the drawer is in open position, a yoke loosely journaled on said frame, operatively connected to said cover-locking means and to said drawer latch and a control key for imparting swinging movement to the yoke, said yoke adapted, during the first part of its movement to unlock the cover and during the last part to produce sidewise movement of said latch, for permitting withdrawal of the drawer.

2. In a cash register, a frame, a totalizer-cover and means for normally locking said cover, a cash drawer having a latch for holding the drawer in closed position, a second latch adapted to normally prevent detaching the drawer from the machine after the drawer is in its open position, a yoke loosely journaled on said frame and having an arm, a link pivoted thereto and releasably engaging said cover, a depressible total indicator control key bar for actuating said yoke to release said second latch only when said key bar is depressed to its fullest extent, for the purposes set forth.

In testimony whereof, I affix my signature.

WILLIAM L. PADEN.